Patented Apr. 14, 1931

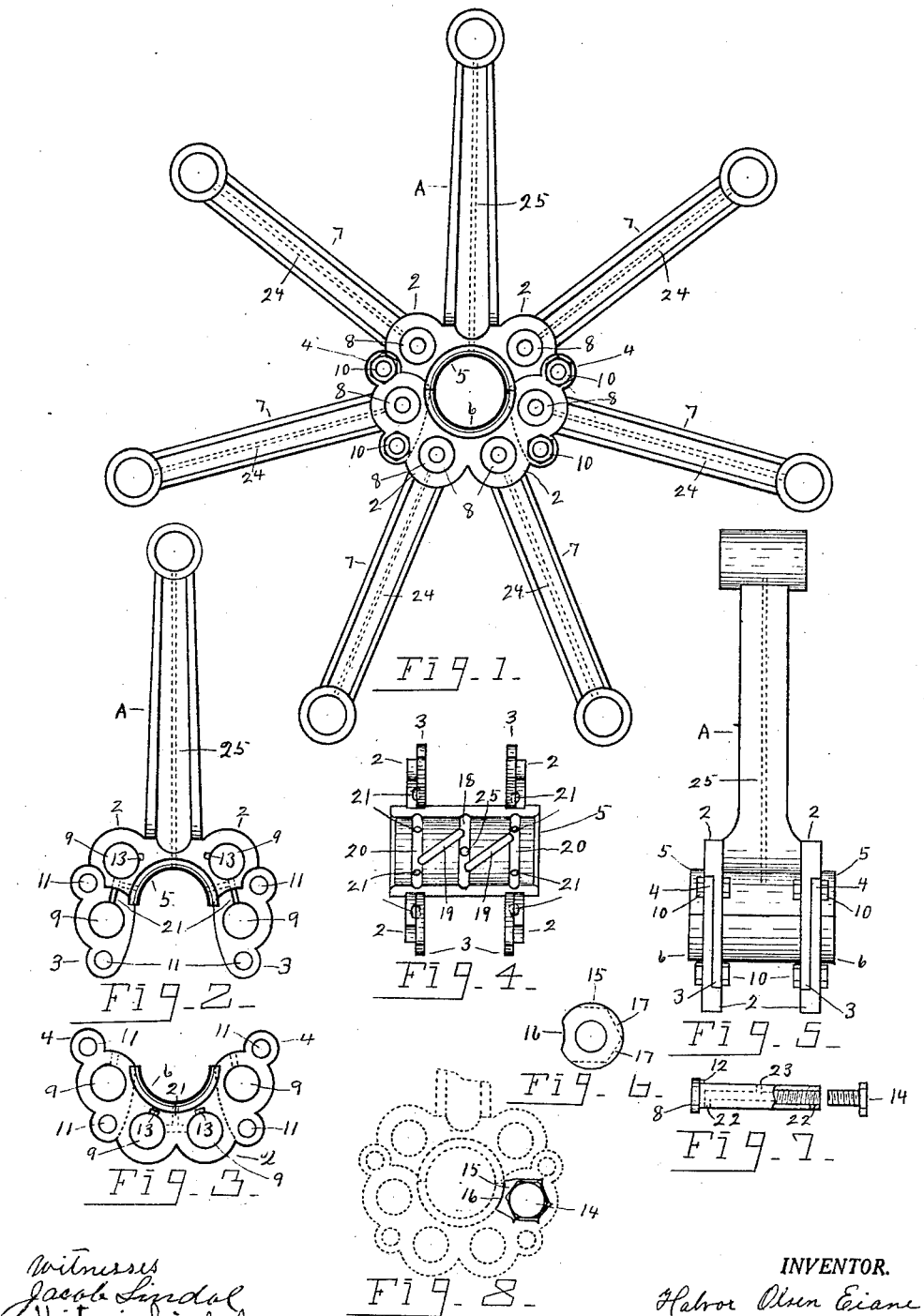

1,800,611

UNITED STATES PATENT OFFICE

HALVOR OLSEN EIANE, OF WASHINGTON ISLAND, WISCONSIN

RADIAL CONNECTING ROD

Application filed February 1, 1930. Serial No. 425,266.

My invention relates to improvements in radial connecting rods for use in engines with radially disposed cylinders, and consists of a master connecting rod and a plurality of articulating rods which in principle bear strong resemblance to my earlier application for patent on a similar invention, filed December 31, 1928, Serial Number 329,395.

The object of my present invention is to provide a stronger and more rigid joining method between the upper and lower halves of the crank-pin bearing, by the use of fixed overlapping extensions in the two circumferential ridges of said bearing.

I attain this object by the use of an invention hereinafter more fully described and claimed having reference to the accompanying drawings in which Figure 1, represents a front view of the complete assembly. Figure 2, is a front view of the master connecting rod which carries the upper half of the crank-pin bearing. Figure 3, is a front view of the lower half of the crank-pin bearing. Figure 4, represents a bottom view of the upper half of the crank-pin bearing, showing oil grooves and oil ducts.

Figure 5, represents a side view of the master connecting rod, with the lower half of the crank-pin bearing in its place. Figure 6, shows the flat side of a lock washer. Figure 7, represents a side view of an articulate bolt with its cap-screw removed from its place.

Figure 8, shows the method of securing a cap-screw against turning, after being scewed into the end of an articulate bolt, by means of a lock-washer.

A, in Figure 1, is the master connecting rod. 2, 2, are the circumferential ridges. 3, 3, are the overlapping extensions in the upper sections of the circumferential ridges 2, 2, and 4, 4, are the overlapping extensions in the lower sections of the circumferential ridges 2, 2.

5 and 6, are the upper and lower halves of the crank-pin bearing respectively. The upper part of the master connecting rod A as represented in Figure 2, is one single integral forged piece; and the lower part as represented in Figure 3, is also one single integral forged piece with the exception of the customary Babbitt lining in the crank-pin bearing.

The articulating rods 7, 7, which are alike in both ends, are movably joined to the master connecting rod A, by the articulating bolts 8, 8, which pass through the holes 9, 9, in the two circumferential ridges 2, 2. The upper half 5, and the lower half 6, of the crank-pin bearing are held together: first, and chiefly by the articulating bolts 8, 8, passing through the holes 9, 9, located in the overlapping extentions 3, 3, and 4, 4, of the circumferential ridges 2, 2; secondly, by the reinforcing bolts 10, 10, which pass through the holes 11, 11, also located inside the area of the overlapping extentions 3, 3, and 4, 4, of the circumferential ridges 2, 2. (Shown more clearly in Figure 5, where shading of the circumferential ridges 2, 2, have been omitted for this purpose.)

The articulating bolts 8, 8, are held rigidly in the holes 9, 9, by the dowel-pins 12, (shown in Figure 7) which fit into notches 13, 13, in the holes 9, 9. The articulating bolts 8, 8, are bored out hollow, so as to make them light in weight, and threaded in the ends opposite to their heads for reception of the cap screws 14, 14. A lock-washer 15, provided with a segmental notch 16, which conform to the contour of the crank-pin bearing on its outside is placed under the head of each cap-screw 14, and turned up at right angles along dotted lines 17, 17, which correspond to the hexagon heads of the cap-screws 14, 14.

Provision for a force-feed lubricating system have been made:

Under the supposition that oil is delivered under pressure from an oil duct, or passage, in a crank-pin; it flows first into the annular groove 18, thence through the communicating grooves 19, 19, and into the annular grooves 20, 20, where the oil is forced into the ducts 21, 21, which are drilled out in the form of a letter T, between the holes 9, 9, and preferably made oval-shaped on their inside so as not to weaken the walls of the circumferential ridges 2, 2, more than necessary.

The ducts 21, 21, correspond with the ducts 22, 22, in the articulating bolts 8, 8, where the oil is delivered at 23, to the articulating rods 7, 7, (indicated by dotted lines in Figure 7,) whence the oil flows through the ducts 24, 24, (indicated by dotted lines in Figure 1) for lubrication of wrist-pins in pistons, (which is outside the limit of my present invention.)

The master connecting rod A, is provided with an oil duct 25, direct from the annular groove 18.

Variation in details of arrangement from those given above may be required for engines with different number of cylinders, and I do not intend to limit my invention to the exact description and drawings as herein given, as many changes can be made without departing from the principles involved.

Having thus described my invention what I claim as new and desire to secure by Letters Patent is:

1. A radial connecting rod assembly for radial engine, comprising a master connecting rod and a plurality of articulating rods, said master connecting rod having a fixed upper half and a detachable lower half crank-pin bearing, a pair of circumferential ridges around said crank-pin bearing provided with extentions forming overlapping split joints, holes through said circumferential ridges and overlapping split joints for insertion of bolts for movably attaching said articulating rods and partially holding said upper and lower halves of said crank-pin bearing together.

2. A radial connecting rod assembly for radial engines, comprising a master connecting rod and a plurality of articulating rods, said master connecting rod having a split crank-pin bearing of upper and lower halves, a pair of circumferential ridges provided with extensions forming overlapping joint areas in said ridges, holes within said overlapping joint areas for insertion of bolts adapted to serve as connections for said articulating rods and to share with reinforcing bolts the purpose of holding said upper and lower halves of said crank-pin bearing together, and suitable means for locking of said bolts against turning.

3. In a radial connecting rod assembly, comprising a master connecting rod with split crank-pin bearing and a pair of circumferential ridges with overlapping joints, a plurality of articulating rods movably joined to said master connecting rod by bolts fitted into holes in said pair of circumferential ridges, and said bolts threaded and fitted with cap-screws and lock-washers at the opposite ends of their heads, said lock-washer provided with a segmental notch adapted to bear against the circular surface of said crank-pin bearing, and their edges turned up to bear against the hexagon heads of said cap-screws for locking purpose substantially as shown and described.

4. In a radial connecting rod assembly comprising a master connecting rod with split crank-pin bearing, a pair of circumferential ridges with overlapping joints, movable connections with a plurality of articulating rods in combination with a suitable force-feed lubricating system in which the oil passages through said circumferential ridges are made diametrically oval so as to present their broad sides to the flat sides of said ridges in order to reduce to a minimum the weakening effect of said oil passages on the strength of said circumferential ridges.

Signed at Washington Island, in the county of Door and State of Wisconsin, this 27th day of January, 1930.

HALVOR OLSEN EIANE.